(12) United States Patent
Zak

(10) Patent No.: US 11,828,208 B2
(45) Date of Patent: Nov. 28, 2023

(54) TWO-STROKE INTERNAL COMBUSTION ENGINE

(71) Applicant: Marek Zak, Brno (CZ)

(72) Inventor: Marek Zak, Brno (CZ)

( * ) Notice: Subject to any disclaimer, the term of this patent is extended or adjusted under 35 U.S.C. 154(b) by 2 days.

(21) Appl. No.: 17/915,072

(22) PCT Filed: Mar. 23, 2021

(86) PCT No.: PCT/CZ2021/050035
§ 371 (c)(1),
(2) Date: Sep. 27, 2022

(87) PCT Pub. No.: WO2021/197518
PCT Pub. Date: Oct. 7, 2021

(65) Prior Publication Data
US 2023/0143774 A1 May 11, 2023

(30) Foreign Application Priority Data

Apr. 1, 2020 (CZ) ................................ CZ2020-184

(51) Int. Cl.
*F01L 7/12* (2006.01)
*F01L 7/06* (2006.01)
(Continued)

(52) U.S. Cl.
CPC ................................. *F01L 7/12* (2013.01);
*F01L 7/06* (2013.01); *F02B 25/06* (2013.01);
*F02B 75/02* (2013.01);
(Continued)

(58) Field of Classification Search
CPC . F01L 7/12; F01L 7/06; F01L 2313/00; F02B 2075/025; F02B 75/02; F02B 25/06
See application file for complete search history.

(56) References Cited

U.S. PATENT DOCUMENTS 2,720,872 A * 10/1955 Yokoi ..................... F02B 25/00
123/65 V
5,257,601 A * 11/1993 Coffin ....................... F01L 7/12
123/73 V
(Continued)

FOREIGN PATENT DOCUMENTS

DE         865237 C    2/1953
EP       0450509 A1   10/1991
(Continued)

OTHER PUBLICATIONS

International Search Report and Written Opinion for PCT application No. PCT/CZ2021/050035, dated Jul. 30, 2021.

*Primary Examiner* — Kevin A Lathers
(74) *Attorney, Agent, or Firm* — Notaro, Michalos & Zaccaria P.C.

(57) ABSTRACT

The invention discloses a two-stroke internal combustion engine having an engine housing with a crankcase in which a crankshaft is connected to a piston moving in a cylinder, an exhaust port leading from the cylinder space and opening at the level of the lower dead center of the crankshaft, the exhaust port is configured to be closed by a piston when the crankshaft is in its top dead center position, characterized in that it further has a rotary disk with an opening or recess on a part of its circumference, or with a protrusion on a part of its circumference, the rotary disk extending with its circumference into the exhaust port so that the exhaust port is completely closable by the rotary disk.

9 Claims, 2 Drawing Sheets

(51) Int. Cl.
    *F02B 25/06*    (2006.01)
    *F02B 75/02*    (2006.01)
(52) U.S. Cl.
    CPC ..... *F01L 2313/00* (2020.05); *F02B 2075/025* (2013.01)

(56) References Cited

U.S. PATENT DOCUMENTS

| | | | | |
|---|---|---|---|---|
| 5,331,927 | A | * | 7/1994 | Solomon ............. F02D 13/0284 251/367 |
| 2003/0230258 | A1 | * | 12/2003 | Niemiz ..................... F02F 1/22 123/65 V |
| 2005/0139179 | A1 | | 6/2005 | Mavinahally et al. |
| 2013/0327306 | A1 | * | 12/2013 | Hooper .................. F02B 75/02 123/65 R |

FOREIGN PATENT DOCUMENTS

| | | | | |
|---|---|---|---|---|
| GB | 284649 | A | | 8/1928 |
| GB | 2269857 | A | | 2/1994 |
| JP | 07150949 | A | * | 6/1995 |
| WO | 2011101878 | A1 | | 8/2011 |

* cited by examiner

TWO-STROKE INTERNAL COMBUSTION ENGINE

TECHNICAL FIELD

This invention relates to a two-stroke internal combustion engine, in particular a two-stroke spark ignition engine. The invention aims to provide charging pressure of the cylinder higher than atmospheric pressure.

BACKGROUND ART

A two-stroke internal combustion engine is a piston engine in which each double stroke of the piston is functional. Compared to a four-stroke engine, a two-stroke engine has higher power, simpler construction and lower weight as well as other advantages. The two-stroke engine is constructed such that the engine housing includes a crankcase in which a crankshaft is connected to a piston moving in a cylinder. An air supply or a mixture of fuel and air, which can be closed by a reed valve, opens into the crankcase, and the crankcase is connected to the space above the piston by an overflow port. The overflow port is open at the bottom dead center of the crankshaft, closed at the top dead center of the crankshaft by a piston. From the space above the piston, an exhaust port leads from the cylinder, which is open in the bottom dead center of the crankshaft and in the top dead center of the crankshaft it is closed by the piston. When the piston moves from the top dead center to the bottom dead center (expansion), the piston first opens the exhaust port with its movement and then the overflow port. Since the mixture is compressed in the crankcase space by moving the piston to the bottom dead center, at the moment of opening the overflow port, the pressure in the crankcase is higher than in the cylinder space, forcing the flue gases out. When the piston moves from the bottom dead center, the piston first closes the overflow port and then the exhaust port, which makes it impossible to achieve a higher charging pressure in the cylinder. The movement of the piston to the top dead center causes a negative pressure in the crankcase, into which a fresh mixture or air is sucked. A common part of the exhaust port is a rotary or sliding slide, which extends into the upper part of the port and serves to aerodynamically move the upper edge of the exhaust port downwards, which results in prolonged expansion and increased torque at lower engine speeds (https://cs.wikipedia.org/wiki/Dvoudob%C3%BD_spalovac%C3%AD_motor #Řízení_výfuku). However, the exhaust port is never completely closed by means of the said slide.

Since these designs do not allow increase of charging pressure, there are solutions in diesel engines providing an external source of compressed air, which is fed through the intake ports directly into the cylinder (not through the overflow port through the crankcase). These intake ports are opened by a piston as well as overflow ports, the exhaust port is replaced by a mechanically operated exhaust valve in the upper part of the combustion chamber. The auxiliary valve reduces the performance because work is required to open it (such systems are described, for example, here: http://www.dieselduck.info/machine/01%20prime%20movers/diesel_engine/diesel_engine.01.htm, or here: http://global.kawasaki.com/en/mobility/marine/machinery/pdf/K-ECOS.pdf). The aim of the present invention is to provide a solution for closing an exhaust port which is simple in construction, efficient and easy to control.

DISCLOSURE OF THE INVENTION

The present invention achieves this aim by providing a rotary disk with an opening or recess on a part of its circumferential portion, or with a protrusion on a part of the circumferential portion, wherein the circumferential portion of said rotary disk extends into an exhaust port such that the exhaust port is completely closable by the rotary disk (more specifically, by its circumferential portion).

The present invention therefore relates to a two-stroke internal combustion engine comprising an engine housing and a crankcase comprising a crankshaft which is connected to a piston moving in a cylinder, an exhaust port leading from the cylinder space wherein the said exhaust port is open when the crankshaft is at its bottom dead center and the said exhaust port is closed by the piston when the crankshaft is in its top dead center, wherein the engine further comprises a rotary disk with an opening or recess on a part of its circumference, or with a protrusion on a part of its circumference, wherein the circumference of the said rotary disk extends into an exhaust port such that the exhaust port is completely closable/openable by means of the rotary disk.

The term "close completely" refers to closing (covering) of the entire cross-sectional area of the exhaust port. The term "completely closable" refers to the ability to completely close the cross-sectional area of the exhaust port. I.e. when the exhaust port is "completely closable" by means of the rotary disk, the rotary disk is configured so that it can completely close the cross-sectional area of the exhaust port during an appropriate time interval within a stroke.

The term "rotary disk" refers to a disk which is capable of rotating around the axis which passes through its geometrical centre and is perpendicular to the plane of the disk.

The position of crankshaft bottom dead center is also a position of piston bottom dead center, and the position of crankshaft top dead center is also a position of piston top dead center.

Typically, the engine includes a crankcase that is separated from the space above the piston, so the engine uses lossless lubrication. The exchange of the working charge is ensured by the ports (intake and exhaust) located in the lower part of the cylinder. The arrangement of the intake and exhaust ports corresponds to the arrangement of the overflow and exhaust ports in some two-stroke engine designs. The intake ports supply fresh working charge (fuel charge) from an external pressure source, such as a mechanical or electric blower. In order to be able to achieve overcharge, i.e. increase the charging pressure above atmospheric pressure, even when the exhaust port opens at a higher position than the intake port and the pressure would thus escape into the exhaust port, the exhaust port according to the present invention is provided with a rotary disk in the vicinity of the cylinder. The rotary disk reaches into the exhaust port and ensures its complete closure at the appropriate time so that the cylinder charge cannot escape. The closing must take place in good time before the intake ports are closed by the piston, but late enough for the charge from the intake ports to push the flue gas residues out of the cylinder space, preferably beyond the position of the rotary disk, so that the rotary disk is not excessively thermally stressed.

The rotary disk is preferably placed as close as possible to the cylinder so that the volume of the exhaust port portion between the piston and the disk is as small as possible.

In some embodiments, the rotary disk may be mounted substantially perpendicular to the cross section of the exhaust port. This ensures that the area closed by the disk is as small as possible, which allows to minimize the size of the rotary disk.

The rotary disk has an axis on which it is mounted and which is the axis of rotation of the disk. The said axis is located outside the exhaust port. Since the flue gases can reach temperatures around 1000° C., it is necessary that the disk mounting and the disk drive are shielded from these temperatures.

Exemplary embodiments of the rotary disk are schematically shown in FIG. 1. FIG. 1a shows a rotary disk with a protrusion on a part of its circumference (circumferential portion), FIG. 1b shows a rotary disk with a recess in a part of its circumference, and FIG. 1c shows a rotary disk with an opening in a part of its circumference.

The open part of the circumference (circumferential portion) of the rotary disk, i.e. the opening, the recess or the part of the circumference without the protrusion, corresponds to the opening time of the exhaust port. The full part of the circumference of the rotary disk, i.e., the protrusion, or the part of the circumference without the opening or without the recess, corresponds to the closing time of the exhaust port.

In the case of the rotary disk in FIG. 1a, the angular length of the protrusion corresponds to the time period of closing of the exhaust port. The rotary disk is then arranged so that the exhaust port is closed by the protrusion from the moment when the piston is substantially in the bottom dead center, which means between 20° before the bottom dead center position and 20° after the bottom dead center position (intake ports are still open and the increase of the charging pressure can occur), at least until the moment when the exhaust port is closed by the piston moving to its top dead center; and so that the exhaust port is open (i.e. not closed by the rotary disk protrusion) when the piston moving from its top dead center opens the exhaust port.

In the case of the rotary disks shown in FIGS. 1b and 1c, the angular length of the opening or recess corresponds to the opening time of the exhaust port, i.e. the time from (at the latest) the opening of the exhaust port by the piston on its way to the bottom dead center until reaching substantially the bottom dead center of the piston movement (substantially the bottom dead center of the piston movement means between 20° before the bottom dead center position and 20° after the bottom dead center position), so that an increase in the charging pressure can be achieved after closing of the exhaust port with the full part of the circumferential portion of the disk.

Angular length of the opening, recess, or the part of the circumference of the disk without the protrusion, respectively, is directly proportional to the gear ratio between the crankshaft and the rotary disk (the larger the gear, the larger the angle). The angular length also directly limits the gear ratio. If the transmission between the crankshaft and the rotary disk is purely mechanical, reasonable values of the gear ratio are 1; 2; 3, because a lower gear ratio does not close the exhaust port fast enough, and a higher gear ratio requires too long angle length. The open portion of the circumference of the rotary disk may have an angular length in the range of, for example, 30 to 330 degrees, the length depending on the particular design as described herein.

The diameter of the rotary disk depends from the dimensions of the drive used and the bearings supporting its shaft.

The rotary disk can be mounted directly on the crankshaft, or on a separate shaft, which is driven by the drive mechanism from the crankshaft. The drive mechanism can include, for example, gears, a chain or a toothed belt. The purely mechanical coupling of the crankshaft and the disk complicates variable timing. Alternatively, the rotary disk may be driven by an electric motor which rotates the disk without any mechanical coupling to the crankshaft.

In one embodiment, the gear ratio of the crankshaft and rotary disk may be constant. In other embodiments, the gear ratio of the crankshaft and the rotary disk may be variable. In some embodiments, the rotation speed of the rotary disk may be independent of the speed of the crankshaft (e.g., in the case of a rotary disk driven by an electric motor). This is advantageous because for different engine speeds the appropriate moment to close the exhaust port needed to achieve optimum cylinder charging may vary. The variability of the gear ratio, i.e. the variable timing of the exhaust port closure, can significantly affect the operating parameters of the engine. The drive of the rotary disk can also be provided by a combination of the above options.

The purpose of the rotary disk is to create a sufficiently large aerodynamic resistance in the exhaust port so that the charging pressure in the cylinder can be increased above atmospheric pressure. This requires the rotary disk to close the exhaust port when the exhaust gases are already removed and the combustion chamber is purged, but while the intake port is still open (substantially bottom dead center of the crankshaft), and keeping the exhaust port closed until the exhaust port is closed by a piston moving to its top dead center.

The rotary disk rotates continuously during the operation of the engine, i.e. it is more energy-efficient. There is no need to expend the energy needed to compress a valve spring, as is currently the case in the prior art engines.

In order to minimize mechanical losses, the rotary disk is preferably mounted in the area of the exhaust port with clearance (i.e. it does not touch the walls of the exhaust port). The choice of the amount of clearance directly influences the maximum achievable cylinder charging pressure.

BRIEF DESCRIPTION OF DRAWINGS

FIG. 2 shows a section of the motor on the right, and a detail of the disk in section AA (as marked on the right) is shown on the left.

FIG. 3 is a section and views of functional moving parts of the engine, with a mechanical drive of the disk from the crankshaft with a gear ratio of 2:1.

(1—rotary disk; 2—exhaust port; 3—intake ports; 4—mechanical disk drive)

DETAILED DESCRIPTION OF THE INVENTION

Figure 3:
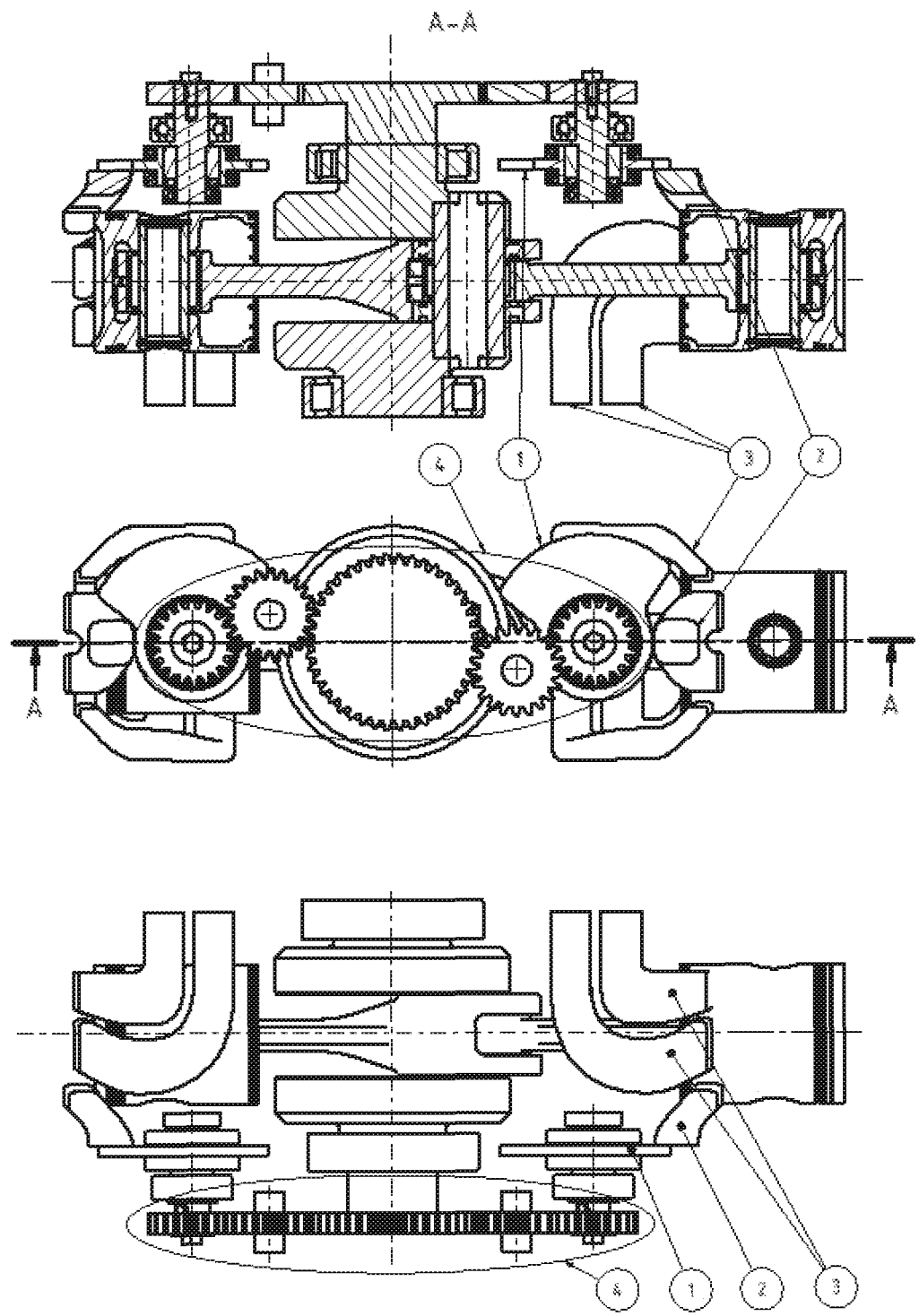

An embodiment of an engine with a rotary disk according to the invention is schematically shown in FIG. 3. The shown design solution relates to a two-cylinder engine for driving an electric generator.

FIG. 3 shows the crankshaft mechanism of the engine. The exhaust port is designated by 2, the intake port is designated by 3.

An embodiment of the engine will be described using specific dimensions to explain the relationships between the engine dimensions and the rotary disk arrangement. It is not intended to limit the scope of the invention to any specific dimension. Based on the description herein, a skilled person will be able to design various embodiments with varying dimensions.

In a specific embodiment, which is described to illustrate the determination of the dimensions of the rotary disk, the engine has a cylinder bore of 70 mm and a stroke of 76 mm. The exhaust port height is 15 mm (wherein the lower edge is at the same height as the piston at the bottom dead center), and the piston is at the level of the upper edge of the exhaust port when the crankshaft is turned by 60° from the lower dead center. This means that during operation, the exhaust port starts to open 60° before the crankshaft bottom dead center and is completely closed 60° after the crankshaft bottom dead center. For example, for 10 mm high intake port, the same applies to a crankshaft rotation angle of 49°.

Figure 1:
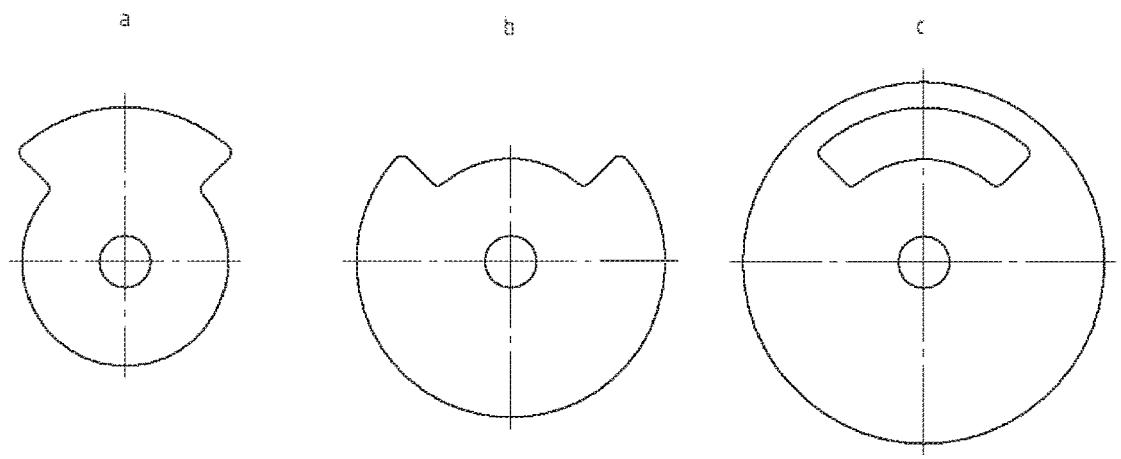
FIG. 1 schematically shows exemplary embodiments of a rotary disk according to the invention.
Figure 2:
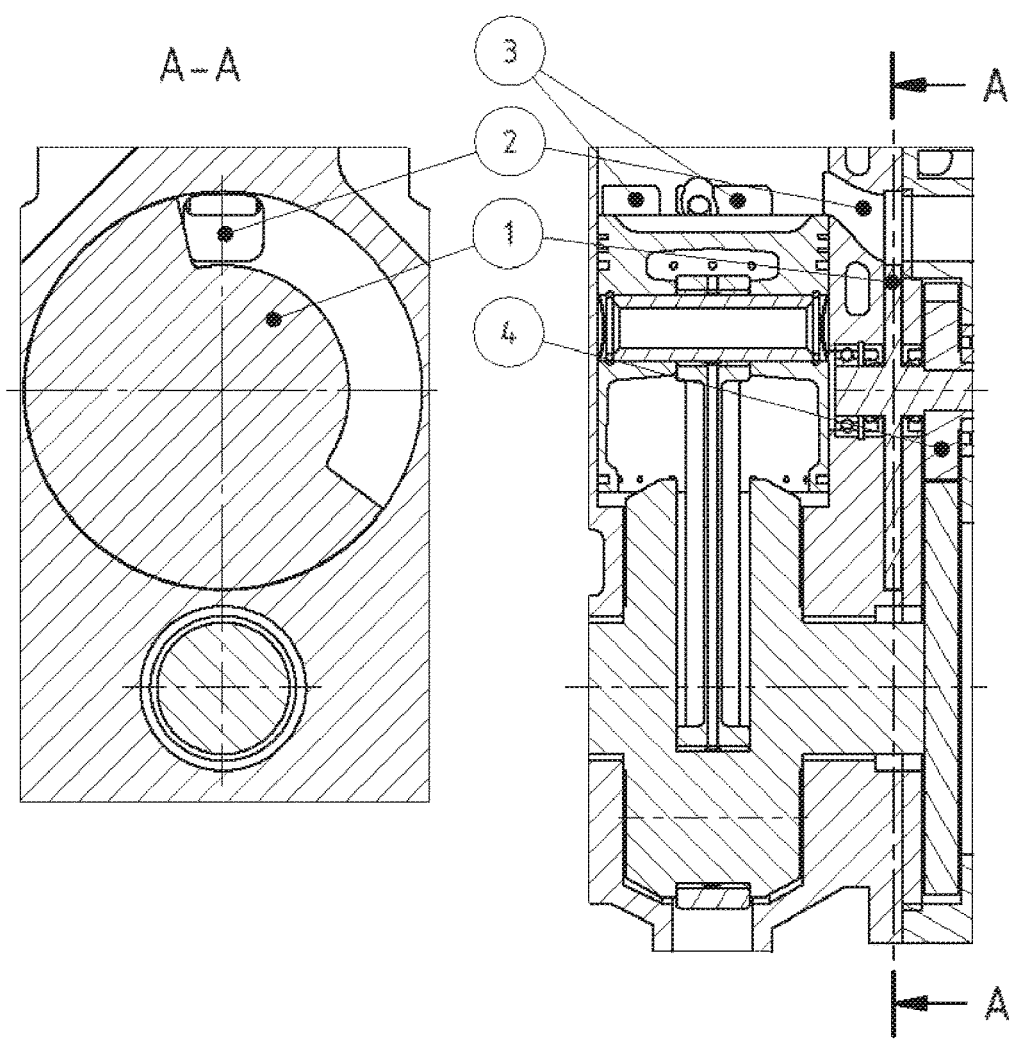
FIG. 2 and FIG. 3 show schematically functional movable parts of a motor with a rotary disk according to the invention.

The exhaust port at the location of the rotary disk has a square shape with a side length of 22 mm with rounded corners with a radius of 5 mm. The rotary disk of the type shown in FIG. 1a with a diameter of 108 mm needs an angular length of the protrusion of 42° to cover the exhaust port.

If we consider that during half of the opening time of the exhaust port we want to keep the exhaust port completely open to exhaust and flush the cylinder, and then we want to start closing the exhaust port (that is, we start closing when the piston is at bottom dead center), so that after complete closing of the exhaust port, the charging pressure is increased due to the influx from the intake ports, then for the described parameters we get the following calculations:

When the gear ratio of the disk and the crankshaft is 1:1, then if we start closing the exhaust port when the piston is at the bottom dead center, the port will be closed 42° after the bottom dead center. The intake ports close 49° after the bottom dead center, so we only have 7° of crankshaft rotation to increase the pressure. The exhaust port must then be kept closed until the crankshaft reaches 60° after the bottom dead center, so the protrusion on the disk must have angular length of at least 60°.

When the gear ratio of the disk and the crankshaft is 2:1, then if we start closing the exhaust port when the piston is at the bottom dead center, the port will be closed 21° after the bottom dead center. The intake ports close 49° after the bottom dead center, so to increase the pressure we have a 28° of the rotation of the crankshaft. The exhaust port must then be kept closed until the crankshaft reaches 60° after the bottom dead center, so that the protrusion on the disk must have angular length of at least 120° (2×60°).

When the gear ratio of the disk and the crankshaft is 3:1, then if we start closing the exhaust port when the piston is at the bottom dead center, the port will be closed 14° after the bottom dead center. The intake ports close 49° after the bottom dead center, so we have 35° of the rotation of the crankshaft to increase the pressure. The exhaust port must then be kept closed until the crankshaft reaches 60° after the bottom dead center, so the protrusion on the disk must be at least 180° (3×60). The requirement for the opening time of the exhaust port, which is a 60° rotation of the crankshaft, also begins to play a role here. This corresponds to the angular length of 180° on the rotary disk. Due to the gear ratio, this means that at the moment the piston starts to open the exhaust port, the rotary disk starts to do the same.

The gear ratio may be varied over time to optimize timing, but the average gear ratio greater than one must always be an integer (1,2,3). The 3:1 gear ratio is the maximum option. A gear ratio less than 1 would have to be divisible by an integer (1:2, 1:3, . . . ), the number of protrusions on the disk would correspond to the integer. As can be seen from the calculation for a 1:1 gear ratio, the selected disk is unsuitable (small).

The smaller the gear ratio, the larger disk would be needed, so that the smallest possible angular length of the disk is needed to close the exhaust port, and to ensure that the exhaust port is closed before the intake ports are closed, leaving time to increase the charging pressure.

If the engine does not work only at a constant speed (constant rotation rate), which gets into the final rotation rate slowly, the size of the rotary disk is important with respect to the moment of inertia and thus the power consumption of its drive. A larger disk means a greater moment of inertia, and therefore greater energy requirements when changing speed (dependent on acceleration).

The size and position of the rotary disk is also affected by other engine components and installation dimensional requirements. If the axis of the disk is parallel to the axis of the crankshaft, the disk can be positioned very close to the cylinder, but the disk size is limited by the axial distances. If the disk is in another position, the distance of the disk affects the space of the crankcase, the cooling of the cylinder etc.

The purpose of the rotary disk according to the invention is not to perfectly seal the exhaust port, but to create a significant pressure drop allowing to increase the charging pressure.

Therefore, the disk is mounted with clearance in its chamber, which extends into the exhaust port. The absence of friction of mechanical parts reduces mechanical losses and thus energy requirements for the disk drive.

The invention claimed is:

1. A two-stroke internal combustion engine comprising:
an engine housing comprising a crankcase separated from a space above a piston;
a crankshaft in the crankcase is connected to the piston moving in a cylinder;
an exhaust port leading from the cylinder and opening at a level of a lower dead center of the crankshaft, said exhaust port configured to be closed by a piston when the crankshaft is at a top dead center position; and
a rotary disk (1) with an opening or recess on a part of a circumference thereof, or with a protrusion on a part of the circumference thereof, said rotary disk extending with the circumference thereof into the exhaust port (2) such that the exhaust port (2) is completely closable by the rotary disk (1), said rotary disk (1) being formed as a single piece.

2. The two-stroke internal combustion engine according to claim 1, wherein the rotary disk (1) is mounted substantially perpendicular to cross-section of the exhaust port (2).

3. The two-stroke internal combustion engine according to claim 1, wherein the rotary disk (1) has an axis on which it is mounted and which is the axis of rotation of the disk, said axis is located outside the exhaust port (2).

4. The two-stroke internal combustion engine according to claim 1, wherein the rotary disk (1) has a protrusion on a part of its circumference and the angular length of the protrusion corresponds to the time of closing of the exhaust port (2), the rotary disk (1) being configured so that the exhaust port (2) is closed by the protrusion from a moment which is between 20° before the crankshaft bottom dead center and 20° after the crankshaft bottom dead center, at least until the moment when the exhaust port (2) is closed by a piston moving to the crankshaft top dead center position, and so that the exhaust port (2) is open when the piston moving from the crankshaft top dead center position opens the exhaust port (2).

5. The two-stroke internal combustion engine according to claim 1, wherein the rotary disk (1) has an opening or recess in part of its circumference and the angular length of the opening or recess corresponds to the opening time of the exhaust port (2), the rotary disk (1) being arranged so that the exhaust port (2) is open for the period starting at the latest from the opening of the exhaust port (2) by the piston on the way to the crankshaft bottom dead center position and ending at a moment between 20° before the crankshaft bottom dead center to 20° after the crankshaft bottom dead center.

6. The two-stroke internal combustion engine according to claim 1, wherein the rotary disk (1) is mounted directly on the crankshaft or on a separate shaft, which is connected to the crankshaft by a drive mechanism (4).

7. The two-stroke internal combustion engine according to claim 1, wherein the rotary disk (1) is mounted with clearance in the space of the exhaust port (2) and does not touch walls of the exhaust port.

8. The two-stroke internal combustion engine according to claim 1, comprising intake ports configured to supply working charge from an external pressure source.

9. A two-stroke internal combustion engine comprising:
an engine housing comprising a crankcase in which a crankshaft is connected to a piston moving in a cylinder;
an exhaust port leading from the cylinder space and opening at a level of a lower dead center of the crankshaft, said exhaust port configured to be closed by the piston when the crankshaft is in a top dead center position;
a rotary disk (1) with an opening or recess on a part of a circumference thereof, or with a protrusion on a part of the circumference thereof, said rotary disk extending with the circumference thereof into the exhaust port (2) such that the exhaust port (2) is completely closable by the rotary disk (1), wherein the rotary disk (1) is driven by an electric motor which is arranged to rotate the rotary disk without mechanical connection to the crankshaft.

\* \* \* \* \*